Patented Apr. 3, 1934

1,953,232

UNITED STATES PATENT OFFICE 1,953,232

PRODUCTION OF MONOCARBOXYLIC ACIDS AND THEIR DERIVATIVES

Alphons O. Jaeger, Crafton, Pa., assignor to The Selden Company, Pittsburgh, Pa., a corporation of Delaware No Drawing. Application April 8, 1929, Serial No. 353,683

11 Claims. (Cl. 260—108)

This invention relates to catalytic processes of producing substituted monocarboxylic acids from polycarboxylic acids and particularly dicarboxylic acids.

In the past certain substituted monocarboxylic acids have been produced from certain substituted dicarboxylic and polycarboxylic acids by various methods, usually involving the heating of salts of the polycarboxylic acids.

According to the present invention substituted monocarboxylic acids are produced from the corresponding substituted polycarboxylic acids and particularly from the corresponding substituted dicarboxylic acids in the vapor phase by passing the vapors of the substituted polycarboxylic acids (those which can be practically volatilized) or some of their derivatives, such as, for example, esters, over suitable catalysts at an elevated temperature, the class of catalysts being that which favors the splitting off of $CO_2$. The reaction can take place in the presence or absence of air, nitrogen or other indifferent gases and may advantageously take place in the presence of steam, particularly when substituted polycarboxylic anhydrides are used. Another modification consists in carrying out the process in the presence of hydrogen, hydrogen containing gases or other reducing gases or vapors such as methyl alcohol with or without steam.

Among the substituted monocarboxylic acids included in the present invention are the various halogen, nitro-, amino-, thio-, and halogen nitrobenzoic acids, naphthoic acids, phenylbenzoic acids, etc., which are formed from the corresponding phthalic acids, naphthalic acids, diphenic acids, etc. Hydrogenated polycarboxylic acids, such as, di- tetra- and hexahydrophthalic acids may also be split by the present invention. In a similar manner, substituted adipic acids, succinic acids, pyrotartaric acids, maleic acids, glutaric acids, and the like may be transformed into the corresponding monocarboxylic acids and in fact the reaction is generally applicable to all substituted polycarboxylic acids and their derivatives which are volatile without decomposition.

The process of the present invention is simple, continuous and cheap and avoids the difficulties present in processes of the prior art. When suitable reaction conditions and catalysts are chosen good yields are obtained with pure products or with products which are readily purified. Thus, for example, when substituted phthalic acids are treated a mixture of the corresponding substituted benzoic acids and unchanged phthalic acids are obtained which can be readily separated.

Theoretically, the formation of the substituted monocarboxylic acids or their derivatives does not require steam. When the anhydrides are used, theoretically a small amount of steam would be required unless hydrogen is present. Practically, I have found that it is desirable to work with an excess of steam, particularly when dealing with the anhydrides, as the presence of a moderate excess of steam, for example 10 to 50 times, appears to prevent or at least retard the decomposition of the monocarboxylic acids formed. At the same time, particularly when carrying out the reaction at high temperature, the presence of steam in moderate excess appear to prevent to a large extent the formation of pyrogenetic byproducts. The invention, however, is not limited to the use of steam and in certain cases it is practical and sometimes desirable to carry out the reaction in the absence of steam, particularly when it is carried out in the presence of a reducing gas. The preferred method, however, involves the utilization of a moderate excess of steam over that theoretically required. The reaction can also be carried out in a continuous process, especially where indifferent gases are used, the indifferent gases being mixed with a substituted polycarboxylic acid together with any steam necessary and the monocarboxylic acid removed at another point in the circuit. In such a circulatory process the carbon dioxide which is produced in the process may be removed by alkalies or by washing with water under pressure or part or all of it may be permitted to remain in the circulation as it does not exercise any deleterious effects on the process and in many cases it is of advantage as an excess of carbon dioxide appears to smooth out the splitting reaction and permits high yields of the substituted monocarboxylic acids. In many cases a better purity is obtained.

The process can be carried out at atmospheric pressure, under a vacuum or at high pressures and with many catalysts, particularly zeolite catalysts, it is desirable to use a moderate pressure. I have found that in most cases 3 to 5 atmospheres is sufficient; the invention is, of course, not limited to any particular pressure.

Instead of utilizing the polycarboxylic acids themselves or their anhydrides, it is possible in some cases to combine the process of the present invention with the catalytic production of the polycarboxylic acids or their anhydrides, for example, the catalytic production of products such as halogen substituted phthalic anhydrides, naphthalic anhydrides, diphenic acids, the like from the corresponding substituted naphthalenes, acenaphthanes, phenanthrenes and the like. In such cases the reaction mixtures containing the acids or their anhydrides may pass directly over suitable carboxy splitting catalysts under the correct reaction conditions. If necessary, steam, may be introduced. It is also practicable to remove certain constituents of this reaction mixture, for example by fractional condensation at high temperature to effect a partial purification, and such processes are included in the scope of the present invention. A typical example of the combined process is a direct production of chlorbenzoic acid from the corresponding chlornaphthalene by passing mixtures of the latter and air over a contact mass containing vanadium compounds or compounds of other suitable catalytic elements and then passing the mixture of reacted gases containing chlorphthalic anhydride, if necessary with the addition of steam, over carboxy splitting catalysts at suitable reaction temperature. It should be noted that in some cases the production of the substituted polycarboxylic acid or its anhydride may be accompanied by a considerable formation of water, particularly where the catalyst used may produce considerable total combustion. In some cases the water thus formed may be sufficient for the following process of splitting off carbon dioxide and of course replaces an equivalent amount of steam which might normally have to be added to carry out the reaction.

Where the reaction is carried on in the presence of hydrogen, especially where the carboxy splitting catalyst also contains components favoring reduction, certain groups in the substituted polycarboxylic acid may be reduced. Thus, for example, under suitable reaction conditions a nitrophthalic anhydride may be transformed into the corresponding aminobenzoic acid or diphenylamine-dicarboxylic acids. A similar result may be obtained when a mixture of chlorphthalic anhydride and nitrophthalic anhydride are split. Such combined reactions in which the carboxy group is split off and at the same time the substituent group is reduced form one modification of the present invention.

The choice of the catalyst or catalysts and reaction conditions will vary with the particular polycarboxylic acid treated. The catalysts include metals, metal oxides, hydroxides, carbonates and other salts both simple and double, and other compounds used singly or in admixture with or without diluents or carriers, such as pumice, quartz, quartz filter stones, fragments of earthenware, silicates, particularly materials rich in silicon, both natural and artificial. Among the effective catalytic components which favor the splitting off of carbondioxide and water are finely divided nickel, copper, iron, zinc, cadmium, FeO, $Fe_2O_3$, $Al_2O_3$, $TiO_2$, CuO, ZnO, CdO, NiO, $Ce_2O_3$, $ZrO_2$, $NO_3$, $N_3O_8$, $SnO_2$, $CdCO_3$, $ZnCO_3$, $CuCO_3$, $NiCO_3$, $ThO_2$, oxides of manganese, lead and the rare earths, carbonates of calcium, borium and lithium, calcium hydroxide, soda lime, double salts of thorium and alkaline earth metals and the like. These catalytic components may be present singly or in admixture.

Minerals can also be used, such as for example bog iron ore, bauxite, pyrolusite and the like.

Very effective contact mass compositions are those containing greater or less amounts of calcium hydroxide or carbonate, or a mixture of calcium and barium carbonates, a mixture of hydroxides or carbonates of calcium and alkali metals, in addition to the oxides and carbonates of the metals copper, nickel, iron, zinc, cadmium, cobalt, lead, aluminum and zirconium.

Basic metal salts, particularly tungstates, molybdates, vanadates, chromates, tantalates, bismuthates, antimoniates, single or in admixtures, are also catalytically effective for the splitting of carboxyl groups from polycarboxylic acids, in the vapor phase. But these salts are for the most part less active than the catalysts described above, require in general higher reaction temperatures, and tend to produce mixtures of poly- and monocarboxylic acids.

Another very important class of catalysts, particularly those containing the catalytic components enumerated above, are base exchange bodies both zeolites and non-silicious, natural and artificial. These base exchange bodies may contain the catalytically active element in non-exchangeable form or as an exchangeable base, and may be both diluted or undiluted. In the former case the zeolite itself may be the catalyst, or the diluent may be catalytically active, or both. Salt-like bodies formed by the action of compounds containing suitable anions with zeolites are also effective in many cases for the reaction, and are included. It should be understood that the zeolites may be either two-component zeolites, that is to say, the reaction products either of metallates or of metal salts with soluble silicates, or they may be the so-called multi-component zeolites, which are reaction products of at least one metallate, at least one metal salt and at least one soluble silicate, which products are described in my prior Patent No. 1,728,732 dated September 17, 1929.

I have found that very desirable catalysts or carriers can also be obtained by treating base exchange bodies with mineral acids to leach out the alkaline exchangeable bases and part or all of the metal elements present in non-exchangeable form. These are the so-called metallo silicic acids or cyclosilicic acids, and share some of the characteristics of zeolites and non-silicious base exchange bodies, particularly their high and frequently submicronic porosity, which renders them so important as contact masses.

It is desirable in many cases to subject catalysts or contact masses such as those described above to the action of reducing gases at elevated temperatures, such as for example hydrogen, water gas, illuminating gas, methane and the like, which in many cases reduces some or all of the metal compounds present to the metallic state, the metals being in an extraordinarily finely divided state. Such catalysts are particularly effective when the reduced metals are associated with alkaline earth compounds, such as for example calcium carbonate.

*Example 1*

6.55 parts of copper nitrate are dissolved in 50 parts of water and precipitated in the form of basic copper carbonate by means of a 2 N. sodium carbonate solution. The precipitate is sucked, lightly washed with water and then kneaded with 6 parts of calcium hydroxide with the gradual addition of 90 parts of water. The suspension thus obtained is then coated on to 200 volumes of pea size pumice granules, preferably by heating the pumice and spraying the suspension on to it with agitation, the excess water being evaporated and a completely uniform coating of the pumice granules being effected.

The contact mass thus produced is filled into a converter and vapors of monochlorphthalic anhydride mixed with steam are passed over the contact mass which is maintained at the reaction temperature of 380-420° C. The proportion of water to chlorphthalic anhydride may be varied within wide limits. I have found that a good proportion is one part of phthalic anhydride to ten parts of water.

The resulting product is chlorbenzoic acid and may contain chlorphthalic acids in varying amounts depending on the load.

Instead of passing vapors of chlorphthalic anhydride over the contact mass, vapors of 3-nitrophthalic anhydride may be substituted under the same reaction conditions producing the corresponding mononitrobenzoic acids. Similarly, 4-nitrophthalic anhydride may be used.

Instead of using copper carbonate as the catalytically effective component of this contact mass, copper oxide, nickel oxide or carbonate and the oxides or carbonates of iron, zinc, cadmium, lead, aluminum, titanium, manganese and thorium may be used singly or in admixture. Calcium hydroxide may be substituted by barium hydroxide or carbonate, soda lime, lithium carbonate or mixtures of the oxides and salts of the alkali and alkaline earth metals. Very effective catalysts for the above process can also be obtained by treating the contact mass described with reducing gases such as hydrogen, water gas and the like, usually the treatment taking place at temperatures from 200 to 400° C. and resulting in the reduction of most of the copper compounds to finely divided copper.

The substituted phthalic anhydride vapor-steam mixture may also be diluted or mixed with indifferent gases such as for example nitrogen, in which case the reaction product may frequently be obtained in solid form. The reaction gases mixed with the excess steam and indifferent gases after leaving the converter are cooled down sufficiently to precipitate the monocarboxylic acids produced in solid form, the temperature, however, being kept sufficiently high so that the excess steam and indifferent gases pass on and can be recirculated through the converter after the addition of the necessary components to re-establish the desired proportions of the reaction ingredients. Carbon dioxide can be permitted to accumulate, and then acts as part or all of the inert gas, or it may be removed from the mixture of steam and fixed inert gas by absorption in alkalies or solution in water under pressure. Air may also be mixed with the vapors of polycarboxylic acid, such as substituted phthalic anhydride and steam, in which case preferably a greater excess of steam is to be used, than when the diluting gas is completely indifferent, as is nitrogen, since under the reaction conditions a catalytic oxidation process might start with some of the catalysts in the presence of the oxygen of the air, which reaction is partly or wholly prevented by sufficient excess steam.

*Example 2*

(1) A solution of 30-36° Bé. potassium waterglass diluted with 10 to 12 volumes of water and containing 48 to 96 parts of $SiO_2$ is treated with sufficient 20 per cent ammonia water until the cloudiness which has formed clears up.

(2) 29 parts of copper nitrate plus $6H_2O$ are dissolved in water to form a N/10 solution, and sufficient strong ammonia water is added until the precipitate which first forms dissolves up again to form a deep blue cuprammonium compound, which is then poured into solution (1) with vigorous stirring.

A 10 per cent aluminum nitrate solution is prepared and is gradually added to the mixture of waterglass and cuprammonium nitrate solution until the reaction mixture is just neutral to phenolphthalein. The reaction product consists of a deep blue gel, which is pressed and dried, when it forms greenish-blue fragments of conchoidal fracture, which disintegrate into small pieces when placed in hot water. The cuprammonium complex can be replaced partly or wholly by nickel complexes, and the aluminum nitrate may also be replaced partly or wholly by other metal salt solutions, such as those containing copper, nickel, iron, manganese, cobalt, silver, lead or zinc, singly or in admixture.

The contact masses thus produced consist of three component zeolites, and are treated with sufficient 5 per cent calcium chloride solution to replace the exchangeable alkali by calcium. This can preferably be effected by trickling the calcium chloride solution over the base exchange body. It is also advantageous to first trickle water over the base exchange body before attempting base exchange.

The contact masses are filled into a converter and vapors of nitronaphthalic anhydride mixed with a great excess of steam are passed over the catalyst at 360-420° C., producing nitronaphthoic acid contaminated with some naphthalene and phthalic anhydride.

Under the same reaction conditions, chlornaphthalic anhydride gives a chlornaphthoic acid, and substituted diphenic acid, such as the halogenated or nitrosubstituted acids give the corresponding substituted phenylbenzoic acids.

The zeolites described above can advantageously be diluted without substantial loss of efficiency by introducing kieselguhr, pumice meal, ground quartz or the like, into the zeolites particularly during formation.

The contact masses diluted or undiluted may be coated onto artificial or natural carrier fragments or formed thereon in situ. Examples of such carrier fragments are pumice stones, filter stones, aluminum granules and granules of metal alloys such as ferrosilicon, ferro-vanadium, ferrochrome, and the like, particularly when the surface of the granules has been roughened or etched. Alkalies or alkaline earths may be used as cementing agents, and tend to activate the catalysis.

*Example 3*

Freshly precipitated aluminum hydroxide containing 10 parts of $Al_2O_3$ are dissolved in a 2 N. potassium hydroxide solution to form potassium aluminate with a 10 per cent excess of caustic potash. 66 parts of aluminum sulfate plus 18 aq. are dissolved in about 200 parts of water and 17 to 18 parts of "Celite" brick refuse (a compacted variety of diatomaceous earth mined by the "Celite" Products Company) or other materials rich in silica, such as glaucosil (the acid leached residue of green sand) or polysilicates with or without base exchanging powers are stirred into the aluminum sulfate solution. Examples of excellent polysilicates are those of calcium, copper, iron, zinc, strontium and barium. These polysilicates not only act as diluents but also positively activate and increase the catalytic power of the contact mass for the particular reaction.

The aluminum sulfate suspension is gradually added to the aluminate solution with vigorous agitation until the solution remains strongly alkaline to litmus or preferably neutral or weakly alkaline to phenolphthalein. The reaction product obtained is freed from the mother liquor and dried at a temperature below 100° C., whereupon it is broken into small fragments and constitutes a diluted non-silicious base exchange body.

The reaction product fragments are hydrated by trickling water over them and then part of the exchangeable alkali base is exchanged for a corresponding amount of calcium oxide or barium oxide in the usual manner using a 5 to 10 per cent solution of the corresponding water soluble salts. After this treatment the base exchange body is impregnated with a chromic acid solution containing 3 to 5 per cent $CrO_3$ in order to form the chromate of the diluted base exchange body, which is a salt-like compound and possesses many of the characteristics of a salt, but is of a chemical constitution not yet definitely determined. The particles are then again dried and used directly as contact masses.

Superheated steam is blown through molten di- or tetrachlorphthalic anhydride at about 190° C. or higher to form a gaseous mixture of the substituted phthalic anhydride and steam. This gaseous mixture is passed over the contact mass described above at 340–450° C., producing the corresponding di- and tetrachlorbenzoic acids contaminated with small amounts of the unchanged phthalic acids.

Instead of blowing steam through chlorphthalic anhydrides, it may be blown through mono- or dinitro- or chlornitrophthalic acid. The corresponding benzoic acids are produced.

Example 4

Monochlornaphthalene vapors mixed with air in the proportion of 1 to 20 are passed over a suitable oxidation catalyst at 370–420° C. An example of such a catalyst is vanadium pentoxide precipitated on aluminum granules. Monochlorphthalic anhydride is produced as an intermediate product in good yield and the monochlorphthalic anhydride vapors, associated with the partly deoxygenated air and with steam, are cooled to about 340–360° C. with the addition of further superheated steam. This mixture is then passed over a catalyst for splitting off carboxyl groups, thus producing a good yield of monochlorbenzoic acid from monochlornaphthalene in a continuous process.

An example of a good catalyst to be used in this second step is the following:—A mixture of 4 parts of zinc oxide and 5 parts of aluminum oxide, freshly precipitated from the corresponding salt solutions by means of 20 per cent ammonia water, are treated with sufficient 2 N. caustic soda solution to produce a solution of sodium zincate and sodium aluminate. 24–30 parts of $SiO_2$ in the form of an ordinary waterglass solution of 33–36° Bè. are diluted with 15–20 volumes of water and 80–100 parts of "Celite" brick refuse and glaucosil or colloidal silicic acid are added. The suspension and solution are mixed together with vigorous agitation and warmed to 50–60° C., whereupon gradually part of an aluminum zinc zeolite precipitates out. In order to increase the yield of this zeolite a 3 to 5 per cent dilute mineral acid such as nitric acid, sulfuric acid or hydrochloric acid is added in a thin stream with vigorous agitation, care being taken that the reaction mixture after complete addition of the acid remains alkaline or neutral to phenolphthalein. A gelatinous mass is obtained, which is freed from the mother liquor by pressing, dried at temperatures under 100° C. and then hydrated in the usual manner with 600–1000 parts of water. After hydrating it is treated with a 1 to 2 per cent mineral acid solution, such as hydrochloric acid or sulfuric acid until substantially all of the exchangeable sodium oxide is dissolved out, producing so-called metallo-silicic acid, which in the present case is a zinc aluminum silicic acid diluted with the materials described above. This body is then dried, and can be directly used for the splitting of the carboxyl group in the process of this example, and gives good results.

Such a contact mass can also be prepared by treating a waterglass solution, containing the diluents as described above, with 5 to 10 per cent solutions of the salts of zinc and aluminum instead of the metallates. For example, nitrates or sulfates may be used, and a zeolite is formed of the aluminum double silicate type which is then subsequently treated as described above and results in a very effective contact mass. Care should be taken, however, that after adding all of the metal salt solutions to the waterglass suspension the reaction mixture must remain alkaline or neutral to phenolphthalein.

The aluminum and zinc compounds described above may be replaced partly or wholly by compounds of other metals having an amphoteric character, such as for example beryllium, cadmium, titanium, zirconium, tin, chromium and particularly lead. These metal compounds may be used singly or in admixture.

The metallo-silicic acids described above may also be pulverized and kneaded with sufficient soda lime in paste form until the mass can be readily formed into pieces. The amount of soda lime which can be used can be varied within wide limits.

Zeolites which have not been treated with mineral acids to form the metallo-silicic acids may also be used as contact masses in the second step of the process of this example, but in such a case it is desirable to replace part of the exchangeable alkali by calcuim, barium or strontium, or by a mixture of these.

Neutral silicates can also be used, particularly when they have been formed under conditions which permit them to remain for a considerable time in the zeolite phase. They may advantageously be diluted with minerals which contain one or more catalytically effective elements.

Example 5

200 volumes of quartz fragments, which are retained by a six-mesh screen, are boiled in a 20 N. KOH solution for three hours and then washed with water followed by diluted hydrochloric acid in the proportion of 125 c. c. of concentrated hydrochloric acid per liter of water. The quartz fragments are then heated and agitated and a sodium chloride solution containing 110–120 grams per liter of water is sprayed onto the quartz. The water from the solution is immediately vaporized on coming into contact with the quartz fragments and produces a very uniform coating.

The contact mass is filled into a converter and a mixture of chlorphthalic anhydride vapors and hydrogen in the proportion of 1 kilo of chlorphthalic anhydride per 3–5 cbm. of hydrogen are passed over the contact mass at 360–420° C., good yields of chlorbenzoic acid being obtained.

The sodium chloride can be partly or wholly replaced by compounds of lithium, potassium, rubidium, caesium, magnesium, calcium, strontium, or barium, the chlorides, phosphates and borates of these elements being very effective.

The quartz may also be replaced with other carrier materials, such as pumice, bauxite, alunite, diaspore, unglazed porcelain, natural and artificial zeolites and non-silicious base exchange bodies, especially leached zeolites and non-silicious base exchange bodies, asbestos, various minerals, silicates, metals, metal alloys, silica gel, slag wool, etc. Apparently the carrier acts partly as a catalyst and partly as an activator. The reaction may be carried out with or without the addition of steam.

*Example 6*

200 volumes of crushed pumice stone retained on a six-mesh screen are coated with 10 parts by weight of zinc oxide in the form of the hydroxide by dissolving 36.5 parts of zinc nitrate with 6 mols of water in 250 volumes of water, precipitating out the hydroxide with concentrated ammonia, filtering, washing and forming a slurry of the cake in 220 volumes of distilled water. The suspension is sprayed onto the pumice, which is heated. The pumice may advantageously be treated with diluted nitric acid before use and dried.

The contact mass is placed in a converter and a mixture of mononitrophthalic anhydride and hydrogen in the ratio of about 3 kilos of the nitrophthalic anhydride per 6.75 cbm. of hydrogen is passed over the contact mass at temperatures between 350 and 450° C., preferably between 380 and 400° C. Large quantities of nitro- and aminobenzoic acids are obtained, especially when higher temperatures are used.

The hydrogen may be replaced with other reducing gases or vapors, such as vapors of methyl alcohol. In such cases nitro- or amino- benzoic acid of excellent purity is obtained. Considerable yields of methyl nitro- or amino- benzoate are also obtained; the main product, however, is nitro- or amino- benzoic acid. Similar results are obtained when various fuel or illuminating gases are used. The zinc in the contact mass may be partly or wholly replaced by beryllium, cadmium, boron, aluminum, titanium, zirconium, tin, lead, thorium, cerium and other rare earths. The elements may be present as oxides or salts or other compounds with or without carrier materials. Other elements of the periodic system may also be present in the contact masses and many minerals form excellent contact masses. Examples of such minerals are cryolite, spinel, corundum, topaz, witherite, barite, calcite, magnesite, dolomite, vanadinite, apatite, borax, carnallite, feldspar, muscovite, rutile, ilmenite, titanite, zircon, thorite, pyromorphite, and the like.

This application is in part a continuation of my co-pending application, Serial No. 223,845, filed October 3, 1927 and application Serial No. 287,901, filed June 23, 1928 now Patent No. 1,714,956 dated May 28, 1929.

What is claimed as new is:

1. A method of preparing monocarboxylic acids containing inorganic substituent groups from the corresponding polycarboxylic acids which comprises vaporizing the polycarboxylic acids and subjecting the vapors admixed with a reducing gas to the action of a decarboxylation catalyst at reaction temperature.

2. A method of preparing monocarboxylic acids containing inorganic substituent groups from the corresponding dicarboxylic acids which comprises vaporizing the dicarboxylic acids and subjecting the vapors admixed with a reducing gas to the action of a decarboxylation catalyst at reaction temperature.

3. A method of preparing monocarboxylic acids containing inorganic substituent groups from the corresponding polycarboxylic acids which comprises vaporizing the polycarboxylic acids and subjecting the vapors admixed with hydrogen containing gas to the action of a decarboxylation catalyst at reaction temperature.

4. A method of preparing monocarboxylic acids containing inorganic substituent groups from the corresponding dicarboxylic acids which comprises vaporizing the dicarboxylic acids and subjecting the vapors admixed with hydrogen containing gas to the action of a decarboxylation catalyst at reaction temperature.

5. A method of preparing monocarboxylic acids containing inorganic substituent groups from the corresponding polycarboxylic acids which comprises vaporizing the polycarboxylic acids and subjecting the vapors admixed with steam and a reducing gas to the action of a decarboxylation catalyst at reaction temperature.

6. A method of preparing monocarboxylic acids containing inorganic substituent groups from the corresponding dicarboxylic acids which comprises vaporizing the dicarboxylic acids and subjecting the vapors admixed with steam and a reducing gas to the action of a decarboxylation catalyst at reaction temperature.

7. A method of preparing monocarboxylic acids containing inorganic substituent groups from the corresponding aromatic dicarboxylic acids which comprises vaporizing the aromatic dicarboxylic acids and subjecting the vapors admixed with a reducing gas to the action of a decarboxylation catalyst at reaction temperature.

8. A method of preparing benzoic acids containing inorganic substituent groups from the corresponding phthalic acids which comprises vaporizing the phthalic acids and subjecting the vapors admixed with a reducing gas to the action of a decarboxylation catalyst at reaction temperature.

9. A method of preparing nitrobenzoic acids from the corresponding nitrophthalic acids which comprises vaporizing the nitrophthalic acids and subjecting the vapors admixed with a reducing gas to the action of a decarboxylation catalyst at reaction temperature.

10. A method of preparing nitrobenzoic acids from nitrophthalic acids which comprises vaporizing the nitrophthalic acids, and passing the vapors admixed with a hydrogen containing gas over a decarboxylation catalyst at a reaction temperature, which catalyst also contains components which favor reduction.

11. A method according to claim 10, in which the hydrogen-containing gas is admixed with steam.

ALPHONS O. JAEGER.